United States Defensive Publication [19] (H) [11] T102,701

Cutler et al. [43] Feb. 1, 1983

[54] INK JET INK COMPOSITION

[76] Inventors: Robert S. Cutler, 6125 Habitat Dr., #1096, Boulder, Colo. 80301; Sterritt R. Fuller, Jr., Deer Trail Rd., Boulder, Colo. 80302

[21] Appl. No.: 353,722

[22] Filed: Mar. 1, 1982

Related U.S. Application Data

[63] Continuation of Ser. No. 170,343, Jul. 21, 1980.

[51] Int. Cl.[3] ..... C09D 11/10; C09D 11/00

[52] U.S. Cl. ..... 524/562; 260/DIG. 38; 524/94; 524/159; 524/190; 8/558

[57] ABSTRACT

A liquid ink for use in ink jet printing, comprising a water-based dye, a water-soluble styrene/acrylic copolymer as the sole binder constituent, water and ammonia as a volatile drying conformant.

9 Claims, No Sheets Drawing,

18 Pages Specification

The file of this unexamined application may be inspected and copies thereof may be purchased (849 O.G. 1221, Apr. 9, 1968).